(12) United States Patent
Kaldunski (10) Patent No.: US 10,758,950 B2
(45) Date of Patent: Sep. 1, 2020

(54) VALVE FOR A CLEAN IN PLACE SYSTEM

(71) Applicant: Loos Machine & Automation, Colby, WI (US)

(72) Inventor: Brian Kaldunski, Marathon, WI (US)

(73) Assignee: Loos Machine & Automation, Colby, WI (US)

( * ) Notice: Subject to any disclaimer, the term of this patent is extended or adjusted under 35 U.S.C. 154(b) by 145 days.

(21) Appl. No.: 16/117,417

(22) Filed: Aug. 30, 2018

(65) Prior Publication Data

US 2020/0070216 A1 Mar. 5, 2020

(51) Int. Cl.
*B08B 9/032* (2006.01)
*F16K 1/20* (2006.01)
*F16K 27/02* (2006.01)
*F16K 11/052* (2006.01)

(52) U.S. Cl.
CPC ............ *B08B 9/032* (2013.01); *F16K 1/2028* (2013.01); *F16K 1/2078* (2013.01); *F16K 11/052* (2013.01); *F16K 27/0227* (2013.01); *Y10T 137/87812* (2015.04)

(58) Field of Classification Search
CPC ............. B08B 9/032; Y10T 137/87812; F16K 1/2078; F16K 1/2028; F16K 27/0227; F16K 11/052
See application file for complete search history.

(56) References Cited

U.S. PATENT DOCUMENTS

| 1,851,034 | A | * | 3/1932 | Blatter | F23L 17/00 137/875 |
|---|---|---|---|---|---|
| 3,773,062 | A | | 11/1973 | McIver | |
| 4,559,967 | A | * | 12/1985 | Gardner | F16K 1/2263 137/340 |
| 5,203,539 | A | * | 4/1993 | Stary | F16K 1/222 251/173 |
| 5,356,116 | A | * | 10/1994 | Morgan | F16K 1/22 251/305 |
| 6,644,352 | B1 | * | 11/2003 | Pfetzer | B60H 1/00485 137/625.44 |

OTHER PUBLICATIONS

Koss Industrial Inc., "Y-Diverter Valve," online operations manual (available at least as early as Aug. 29, 2018) 1 page, https://www.kossindustrial.com/material-handling/6948-y-diverter-valve.html.

* cited by examiner

*Primary Examiner* — Jessica Cahill
*Assistant Examiner* — Patrick C Williams
(74) *Attorney, Agent, or Firm* — Michael Best and Friedrich LLP (57) ABSTRACT

A valve for a clean in place system is described. The valve includes an inlet portion, an outlet portion including a first outlet and a second outlet, and a flow diverter positioned between the inlet portion and the outlet portion. The flow diverter includes a planar portion sized to extend across the first and second outlets, and a cylindrical portion defining an opening. The valve also includes a first seal between the inlet portion and the outlet portion, and an actuator for moving the flow diverter between a first position to form a first flow path in which the inlet is fluidly connected to the first outlet, and a second position to form a second flow path in which the inlet is fluidly connected to the second outlet. The valve includes multiple seals fluidly connected to the flow path to enable the valve to be cleaned in place.

20 Claims, 7 Drawing Sheets

VALVE FOR A CLEAN IN PLACE SYSTEM

BACKGROUND

The present invention relates to valves, and more particularly to a valve for a clean in place system.

SUMMARY

Fluid processing systems, such as systems processing dairy products, use diverter valves that allow for a sample of the fluid flowing through the system to be collected without having to stop the operation of the processing system.

Some embodiments of the present invention provide a valve for a clean in place system. The valve includes an inlet portion, an outlet portion including a first outlet and a second outlet, and a flow diverter positioned between the inlet portion and the outlet portion. The flow diverter includes a planar portion sized to extend across the first and second outlets, and a cylindrical portion defining an opening. The valve also includes a first seal between the inlet portion and the outlet portion, and an actuator for moving the flow diverter between a first position to form a first flow path in which the inlet is fluidly connected to the first outlet, and a second position to form a second flow path in which the inlet is fluidly connected to the second outlet. The actuator includes an elongate fastener extending into the opening of the cylindrical portion, a first stub shaft engaging the opening such that the flow diverter rotates with the first stub shaft about the elongate fastener, and a second seal between the cylindrical portion and the first stub shaft. The actuator further includes a bushing around the first stub shaft, a third seal between the bushing and the first stub shaft, and a second stub shaft to retain the bushing, the first stub shaft, the second seal, and the third seal on the elongate fastener and to compress the second and third seals. At least one of the first, second, and third seals is fluidly connected to the flow path.

Some embodiments of the present invention provide a clean in place system including a fluid source, a first fluid channel, a second fluid channel, a valve configured to be coupled between the fluid source, the first fluid channel and the second fluid channel. The valve includes an inlet portion, an outlet portion including a first outlet and a second outlet, and a flow diverter positioned between the inlet portion and the outlet portion. The flow diverter includes a planar portion sized to extend across the first and second outlets, and a cylindrical portion that defines an opening. The valve also includes a first seal between the inlet portion and the outlet portion, and an actuator for moving the flow diverter between a first position to form a first flow path in which the inlet is fluidly connected to the first outlet, and a second position to form a second flow path in which the inlet is fluidly connected to the second outlet. The actuator includes an elongate fastener that extends into the opening of the cylindrical portion, a first stub shaft that engages the opening such that the flow diverter rotates with the first stub shaft about the elongate fastener, and a second seal between the cylindrical portion and the first stub shaft. The actuator further includes a bushing around the first stub shaft, a third seal between the bushing and the first stub shaft, and a second stub shaft to retain the bushing, the first stub shaft, the second seal, and the third seal on the elongate fastener and to compress the second and third seals. At least one of the first, second, and third seals is fluidly connected to the flow path.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
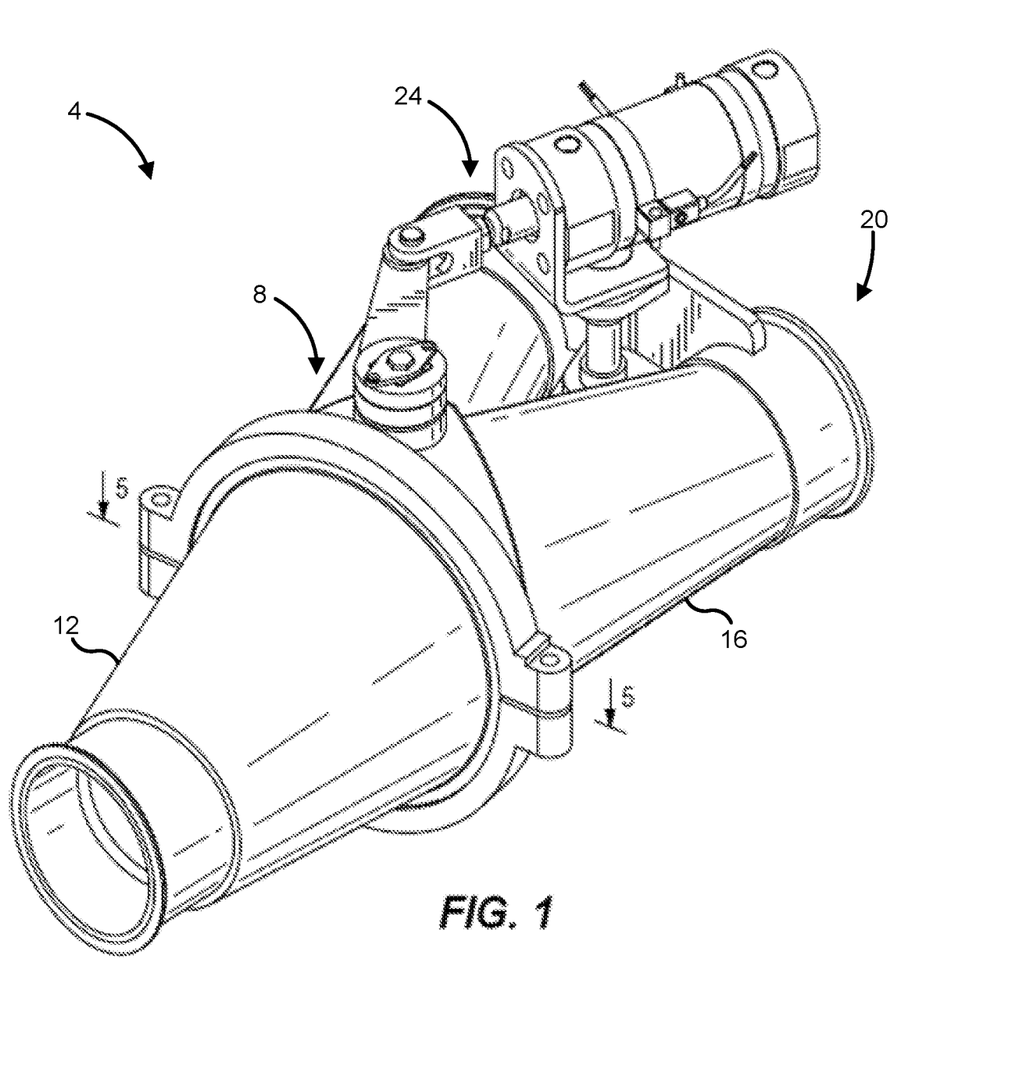
FIG. 1 is a perspective view of a valve described herein.

FIG. 1 is a perspective view of a valve 4 described herein. The illustrated valve 4 is a diverter valve that may be implemented with a clean in place system of a process control system. In some examples, the valve 4 may be used with food products, such as dairy products. The valve 4 has a valve body 8 including an inlet portion 12 and an outlet portion 16. The outlet portion 16 includes a first outlet 20 and a second outlet 24. In some embodiments, first outlet 20 is primary outlet and the second outlet 24 is used when the flow of the fluid is diverted.

Figure 2:
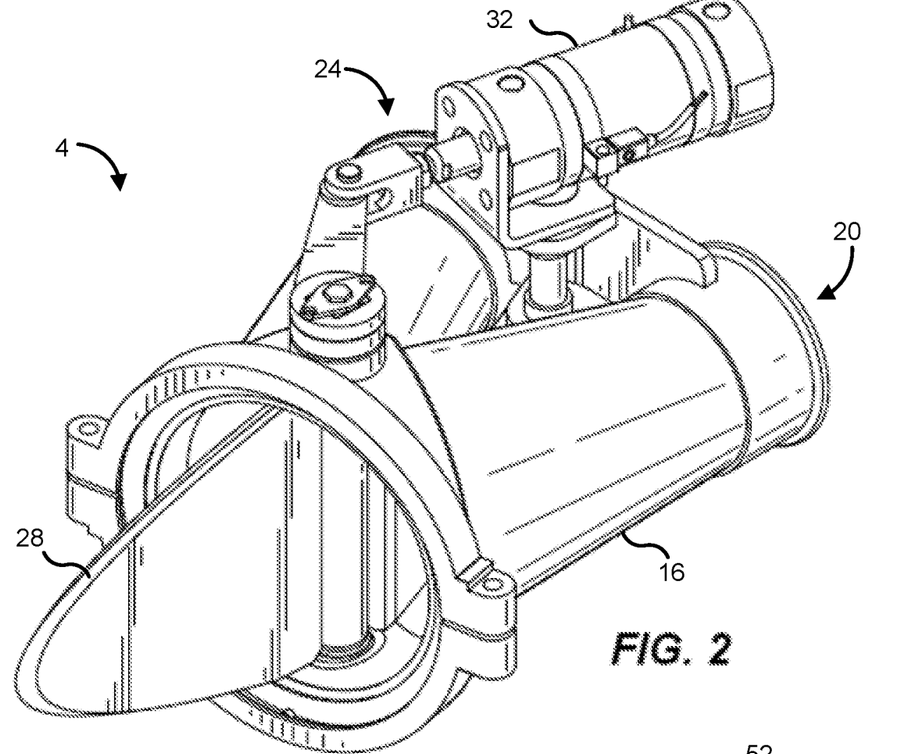
FIG. 2 is a partial perspective view of the valve without an inlet portion and depicting a flow diverter positioned in valve.

FIG. 2 is a partial perspective view of the valve 4 depicting a flow diverter 28 positioned within the valve 4. The flow diverter 28 is positioned within the inlet portion 12 of the valve body 8 and is operative to rotate between a first position and a second position. An actuator 32 is coupled to the outlet portion 16 of the valve body 8 and is operatively coupled to the flow diverter 28 to change a position of the flow diverter 28. The actuator 32 rotates the flow diverter 28 between the first position to form a first flow path in which the inlet portion 12 is fluidly connected to the first outlet 20, and the second position to form a second flow path in which the inlet 36 is fluidly connected to the second outlet 24.

Figure 3:
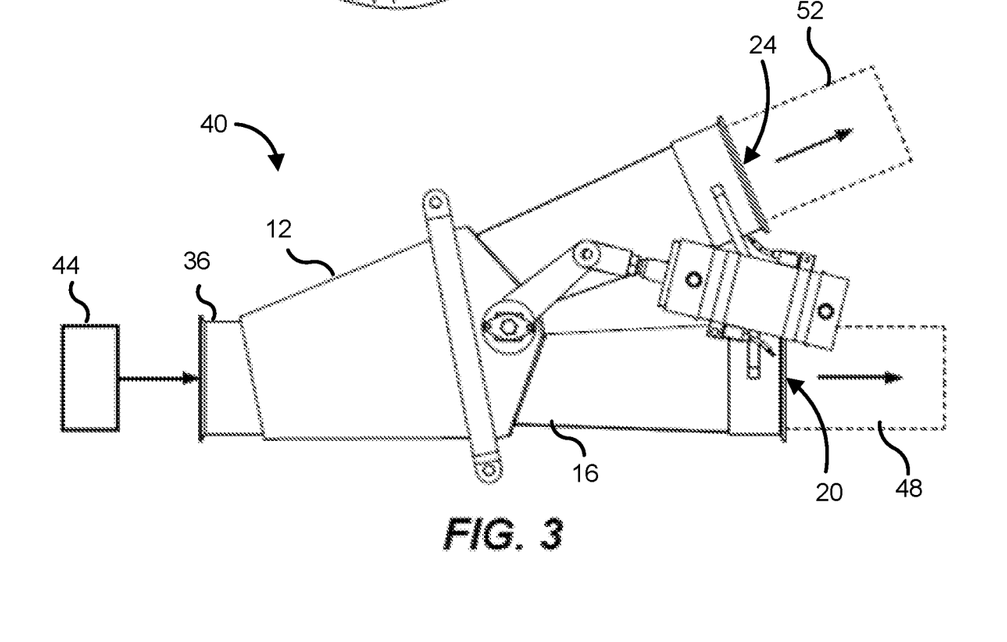
FIG. 3 is a schematic view of a system in which the valve is implemented.

FIG. 3 depicts a schematic view of an example system 40 in which the valve 4 may be implemented. The inlet portion 12 includes an inlet 36 that is coupled to a fluid source 44 to receive fluid from the fluid source 44. The fluid source 44 may be any type of fluid source, such as a tank or processing equipment from which the fluid flows to the valve 4. The first outlet 20 of the outlet portion 16 is coupled to a first fluid channel 48. The second outlet 24 of the outlet portion 16 is coupled to a second fluid channel 52. The first and second fluid channels 48, 52 may be fluidly coupled to receptacles for collecting the fluid, or may be connected to processing equipment to further process the fluid. For example, the first outlet 20 may be fluidly connected to a main fluid tank via the first fluid channel 48. The second outlet 24 may be connected to a sample vessel via the second fluid channel 52 so that samples of the fluid can be collected without stopping the production process.

Figure 4:
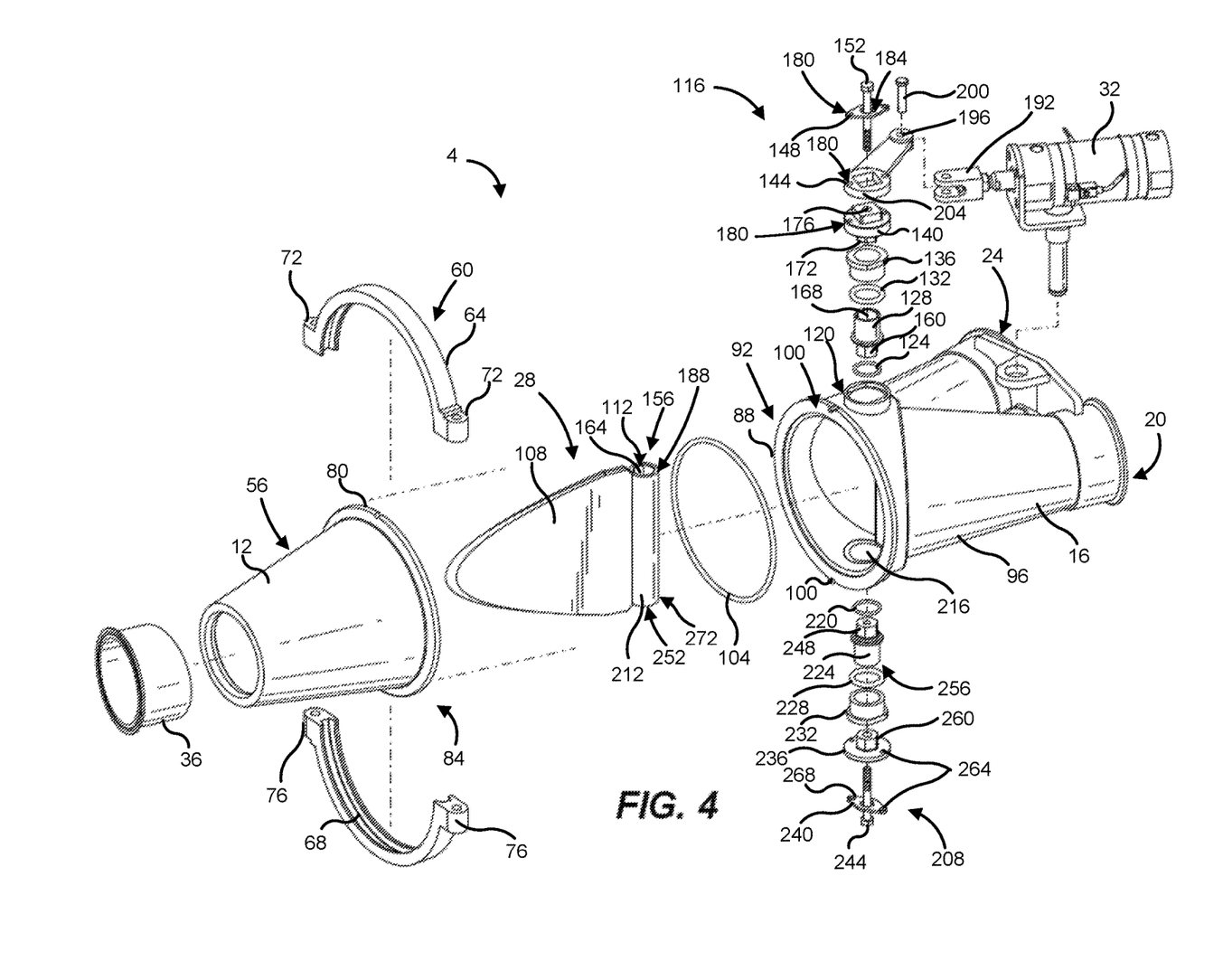
FIG. 4 is an exploded view of the valve.

FIG. 4 is an exploded view of the example valve 4. The inlet portion 12 includes a conically-shaped housing 56 fluidly coupled to the inlet 36. The inlet 36 may be removably coupled to the housing 56 of the inlet portion 12. The housing 56 is shaped such that the flow diverter 28 can be positioned within the housing 56 to divert the flow of the fluid between the first fluid flow path and the second fluid flow path. The shape of the housing 56 and the shape of the flow diverter 28 allow the flow diverter 28 to move between the first position and the second position within the housing 56 of the inlet portion 12 and to substantially prevent fluid from flowing between the inlet 36 and the second outlet 24 when the flow diverter 28 is in the first position, and to substantially prevent fluid from flowing between the inlet 36 and the first outlet 20 when the flow diverter 28 is in the second position.

The inlet portion 12 is coupled to the outlet portion 16 via a clamp 60. The illustrated clamp 60 includes a first half 64 and a second half 68 and is secured by fasteners on ends 72, 76 of the first and second halves 64, 68. The inlet portion 12 includes a first flange 80 around a circumference of a large end 84 of the inlet portion 12 housing 56. The outlet portion 16 includes a second flange 88 around a circumference of an end 92 of a housing 96 of the outlet portion 16. The first and second flanges 80, 88 are retained within the clamp 60 to enable the clamp 60 to couple the inlet portion 12 to the outlet portion 16. Additional fasteners 100 positioned on the first and second flanges 80, 88 may facilitate the connection of the inlet portion 12 to the outlet portion 16. The illustrated fasteners 100 are protrusions that are received into notches to properly orient the inlet portion 12 and the outlet portion 16. A first seal 104 is positioned between the first flange 80 of the inlet portion 12 and the second flange 88 of the outlet portion 16 to prevent leaks at a joint between the inlet portion 12 and the outlet portion 16. The flow diverter 28 may be removed from the outlet portion 16 by removing the inlet portion 12 and disconnecting the flow diverter 28 from the housing 96 of the outlet portion 16.

The illustrated flow diverter 28 includes a planar portion 108 and a cylindrical portion 112. The planar portion 108 is sized to extend across the first outlet 20 when the flow diverter 28 is in the second positon to inhibit flow through the first outlet 20, and the second outlet 24 when the flow diverter 28 is in the first position to inhibit flow through of the second outlet 24.

The flow diverter 28 is coupled to the actuator 32 via a first connection assembly 116. The first connection assembly 116 is at least partially positioned within a first aperture 120 of the housing 96 of the outlet portion 16. The first connection assembly 116 includes a second seal 124, a first stub shaft 128, a third seal 132, a first bushing 136, a second stub shaft 140, a lever 144, a plate 148, and an elongate fastener 152. The second seal 124 is positioned between a first end 156 of the cylindrical portion 112 of the flow diverter 28 and the first stub shaft 128. The first stub shaft 128 compresses second seal 124 against the first end 156 of the cylindrical portion. The illustrated second seal 124 is an O-ring. The first stub shaft 128 has a keyed protrusion 160 extending into a corresponding opening 164 at the first end 156 of the cylindrical portion 112. The keyed protrusion 160 and the opening 164 of the illustrated first connection assembly 116 are hexagonal, but any other shape that creates a keyed interaction between the second stub shaft and the lever may be used. The first stub shaft 128 also includes a keyed aperture 168 opposite the keyed protrusion 160. The third seal 132 is between at least a portion of the first stub shaft 128 and the bushing 136. The illustrated third seal 132 is an O-ring. The first bushing 136 is positioned around the first stub shaft 128.

The second stub shaft 140 is positioned at an end of the bushing 136 and the first stub shaft 128. The second stub shaft 140 includes a first keyed protrusion 172 corresponding to the keyed aperture 168 of the first stub shaft 128. The first keyed protrusion 172 is disposed in the keyed aperture 168 and is hexagonal in the illustrated first connection assembly 116, but any other shape that creates a keyed interaction between the second stub shaft 140 and the first stub shaft 128 may be used. In the illustrated first connection assembly 116, the second stub shaft 140 also includes a second keyed protrusion 176 opposite the first keyed protrusion 172. The lever 144 is coupled to the second stub shaft 140 via the second keyed protrusion 176. The second keyed protrusion 176 of the illustrated second stub shaft 140 is square, but any other shape that creates a keyed interaction between the second stub shaft 140 and the lever 144 may be used. The plate 148 is coupled to the lever 144 and the second stub shaft 140 via fasteners disposed through apertures 180. The plate 148 acts as a washer and includes a hexagonal aperture 184 to retain the elongate fastener 152 in the cylindrical portion 112 as the cylindrical portion 112 rotates. The elongate fastener 152 extends through the first connection assembly 116 and into a threaded bore 188 within the opening 164 of the first end 156 of the cylindrical portion. The elongate fastener 152 is operative to compress the second and third seals 124, 132.

The actuator 32 is coupled to the housing 96 of the outlet portion 16 and is positioned adjacent the first connection assembly 116. The actuator 32 includes an arm 192 operative to move in a linear motion. The arm 192 is coupled to a first end 196 of the lever 144 via a fastener 200. The lever 144 is coupled to the second stub shaft 140 at a second end 204. As the arm 192 of the actuator 32 is moved linearly, the first end 196 of the lever 144 coupled to the arm 192 rotates around the fastener 200. The movement of the first end 196 of the lever 144 causes the second end 204 of the lever 144 to rotate, thus rotating the second stub shaft 140 and the flow diverter 28 via the first stub shaft 128 of the first connection assembly 116.

A second connection assembly 208 is positioned at a second end 212 of the cylindrical portion 112 to couple the second end 212 to the outlet portion 16 via an aperture 216 of the housing 96. The second connection assembly 208 includes a fourth seal 220, a third stub shaft 224, a fifth seal 228, a second bushing 232, a fourth stub shaft 236, a second plate 240, and a second elongate fastener 244. The second connection assembly 208 is similar to the first connection assembly 116, except the illustrated second connection assembly 208 does not include a lever and the illustrated fourth stub shaft 236 does not include a second protrusion for coupling a lever to the fourth stub shaft. The fourth seal 220 is positioned to abut the second end 212 of the cylindrical portion 112 of the flow diverter 28. The third stub shaft 224 is positioned to compress the fourth seal 220 against the second end 212 of the cylindrical portion. The illustrated fourth seal 220 is an O-ring. The third stub shaft 224 has a keyed protrusion 248 extending into a corresponding opening 252 at the second end 212 of the cylindrical portion 112. The keyed protrusion 248 and the opening 252 of the illustrated second connection assembly 208 are hexagonal, but any other shape that creates a keyed interaction between the third stub shaft and 224 the fourth stub shaft 236 may be used. The third stub shaft 224 also includes a keyed aperture 256 opposite the keyed protrusion 248. The fifth seal 228 is between at least a portion of the third stub shaft 224 and the second bushing 232. The illustrated fifth seal 228 is an O-ring. The second bushing 232 is positioned around the third stub shaft 224.

The fourth stub shaft 236 is positioned at an end of the second bushing 232 and the third stub shaft 224. The fourth stub shaft 236 includes a keyed protrusion 260 corresponding to the keyed aperture 256 of the third stub shaft 224. The keyed protrusion 260 is disposed in the keyed aperture 256 and is hexagonal in the illustrated second connection assembly 208, but any other shape that creates a keyed interaction between the third stub shaft 224 and the fourth stub shaft 236 may be used. The second plate 240 is coupled to the fourth stub shaft 236 via fasteners disposed through apertures 264. The second plate 240 acts as a washer and includes a hexagonal aperture 268 to retain the second elongate fastener 244 in the cylindrical portion 112 as the cylindrical portion 112 rotates. The second elongate fastener 244 extends through the second connection assembly 208 and into a threaded bore 272 within the opening 252 of the second end 212 of the cylindrical portion 112. The second elongate fastener 244 is operative to compress the fourth and fifth seals 220, 228.

Figure 5:
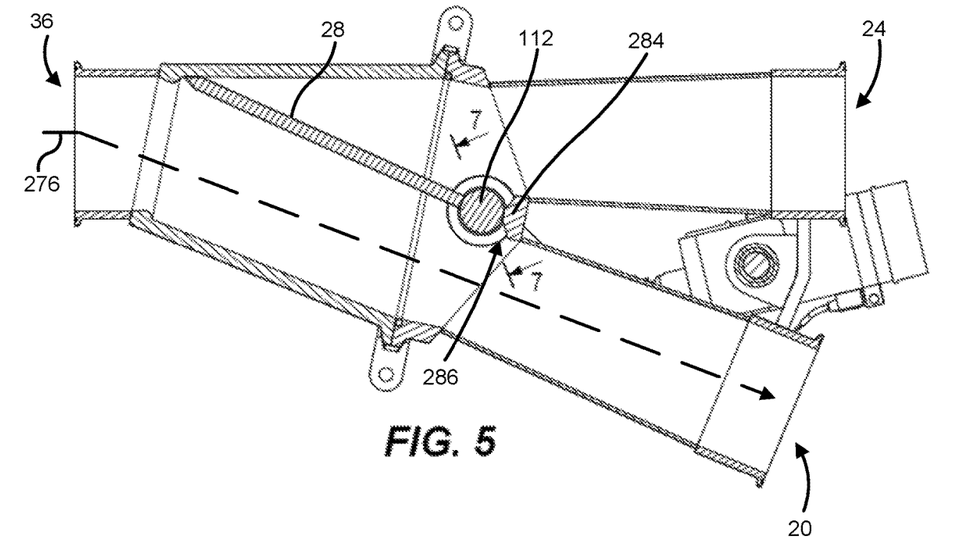
FIG. 5 is a cross-sectional view taken along line 5-5 of FIG. 1 depicting the flow diverter in the first position.
Figure 6:
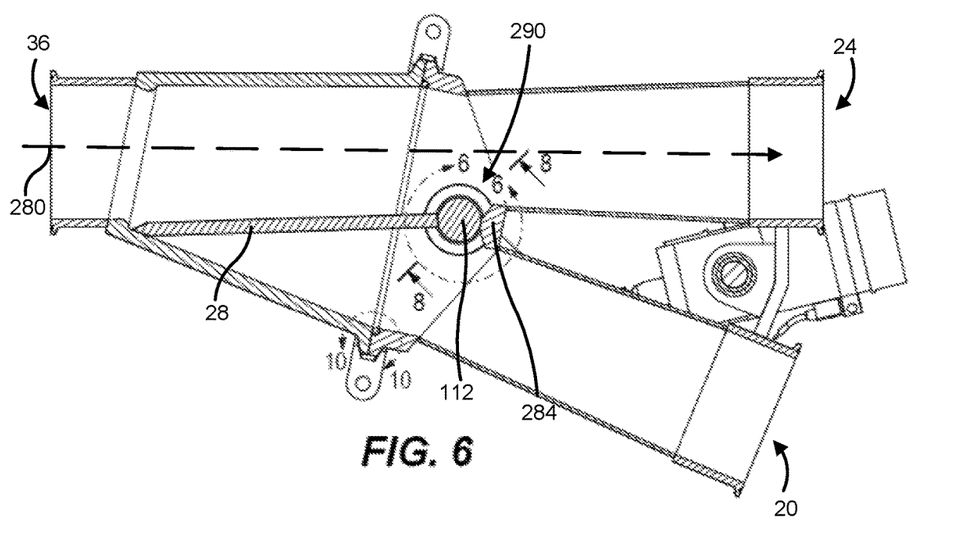
FIG. 6 is a cross-sectional view take along line 5-5 of FIG. 1 depicting the flow diverter in the second direction.

FIGS. 5 and 6 are cross-sectional views of the valve 4 showing the flow diverter 28 in the first and second positions, respectively. The flow diverter 28 rotates around an axis of the cylindrical portion 112 between the first position in which the fluid flows via a first fluid flow path 276 to the first outlet 20, as shown in FIG. 5, and the second position in which the fluid flows via a second fluid flow 280 path to the second outlet 24, as shown in FIG. 6. The illustrated cylindrical portion 112 is in contact with a seal bar 284 adjacent the first and second outlets 20, 24. The seal bar 284 facilitates sealing between the first flow path 276 in which the flow diverter 28 is in the first position and the second flow path 280 in which the flow diverter 28 is in the second position. The illustrated seal bar 284 also facilitates a clean in place operation of the valve 4 because the seal bar 284 is fluidly connected to both the first flow path 276 and the second flow path 280. As the cylindrical portion 112 rotates between the first position and the second position, the area of the cylindrical portion 112 in contact with the seal bar 284 changes. That is, in the first position, a first contact area 286 between the seal bar 284 and the cylindrical portion 112 is accessible by cleaning fluid for a clean in place operation, and in a second position, a second contact area 290 between the seal bar 284 and the cylindrical portion 112 is accessible by a cleaning fluid for a clean in place operation.

Figure 7:
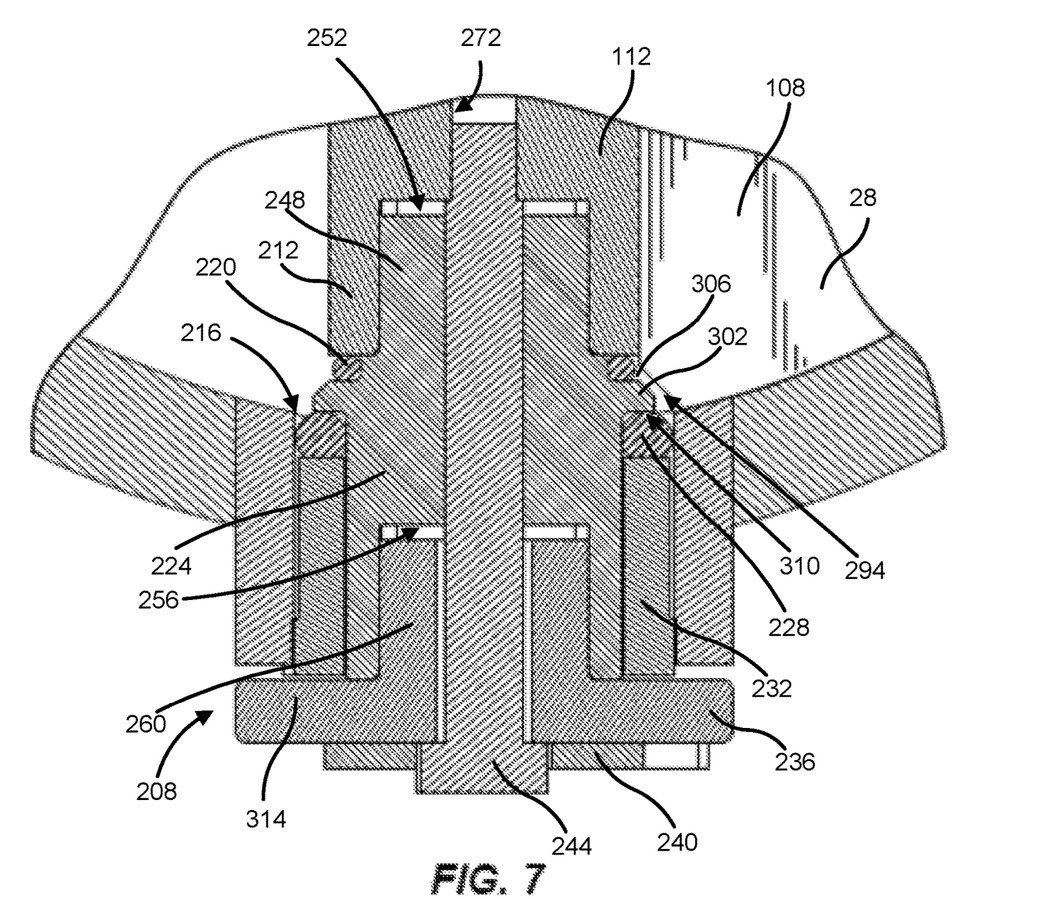
FIG. 7 is a cross-sectional view taken along line 7-7 of FIG. 5 of the connection of the flow diverter to the valve body depicting the flow diverter in the first position.
Figure 8:
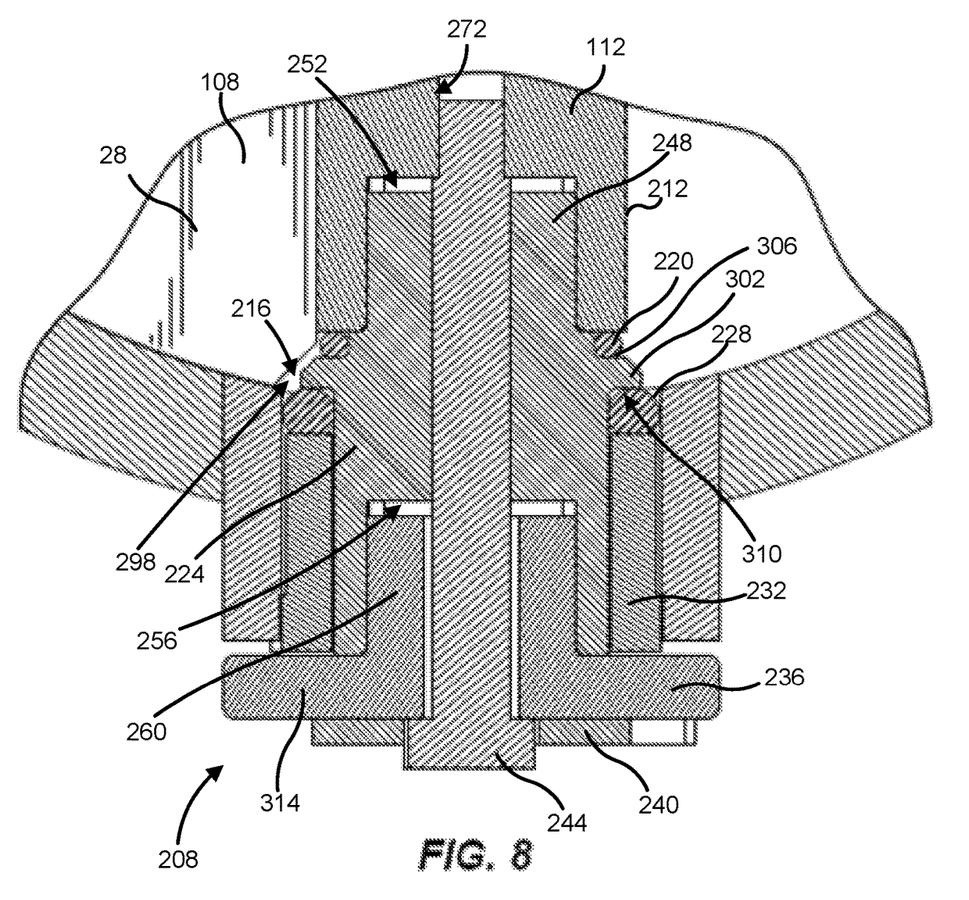
FIG. 8 is a cross-sectional view taken along line 8-8 of FIG. 6 of the connection of the flow diverter to the valve body depicting the flow diverter in the second position.

FIGS. 7 and 8 are cross-sectional views of the connection between the cylindrical portion 112 of the flow diverter 28 and the outlet portion 16 of the valve body 8. FIG. 7 depicts the flow diverter 28 in the first position and FIG. 8 depicts the flow diverter 28 in the second position. A first narrow fluid flow path 294 is formed when the flow diverter 28 is in the first position and is located between planar portion 108 of the flow diverter 28 and the seals 220, 228 and the third stub shaft 224 of the second connection assembly 208. A second narrow fluid flow path 298 is formed when the flow diverter 28 is in the second position, which is similar to the first narrow fluid flow path 294. Similar narrow flow paths are located adjacent the second and third seals 124, 132 and the first stub shaft 128 of the first connection assembly 116. The narrow flow paths 294, 298 enable fluid to be in contact with the seals 124,132, 220, 228 adjacent the first and second ends 156, 212 of the cylindrical portion 112 at all times to enable the valve 4 to be cleaned in place. That is, during a cleaning operation, cleaning fluid can make contact with the seals 124,132, 220, 228 at all times, independent of the positon of the flow diverter 28, to facilitate cleaning the seals 124,132, 220, 228 because the seals 124,132, 220, 228 are fluidly connected to both the first flow path 276 and the second flow path 280. Any surface or part of the seals 124,132, 220, 228 that is exposed to a fluid during normal operation of the valve 4 and the processing system is exposed to a cleaning fluid during a cleaning operation of the valve 4 and the processing system.

FIGS. 7 and 8 specifically depict a cross-section of the second connection assembly 208 at the second end 212 of the cylindrical portion 112 of the flow diverter 28 to the outlet portion 16 of the valve body 8. The first connection assembly 116 is similar except that the first connection assembly 116 includes the lever 144 and a second keyed protrusion 176 of the second stub shaft 140, as described in conjunction with FIG. 4. The cross-sectional views of FIGS. 7 and 8 depict the second elongate fastener 244 extending into the bore 272 of the opening 252 in the cylindrical portion 112. The 272 bore may be threaded to enable the second elongate fastener 244 to be adjusted to provide more or less compression of the fourth and fifth seals 220, 228.

The third stub shaft 224 includes a flange 302 having a first surface 306 to press the fourth seal 220 against the second end 212 of the cylindrical portion 112 to facilitate compression of the fourth seal 220. The flange 302 has a second surface 310 to press the fifth seal 228 against the second bushing 232 to further facilitate compression of the fifth seal 228. The second bushing 232 is fitted around the third stub shaft 224 to facilitate compression of the fourth and fifth seals 220, 228. The fourth stub shaft 236 has a flange 314 to engage the third stub shaft 224 and the second bushing 232 and is operative to retain the second bushing 232, the third stub shaft 224, and the seals 220, 228 on the second elongate fastener 244. The first and second stub shafts 128, 140 of the first connection assembly 116 have similar flanges to perform similar functions.

Figure 9:
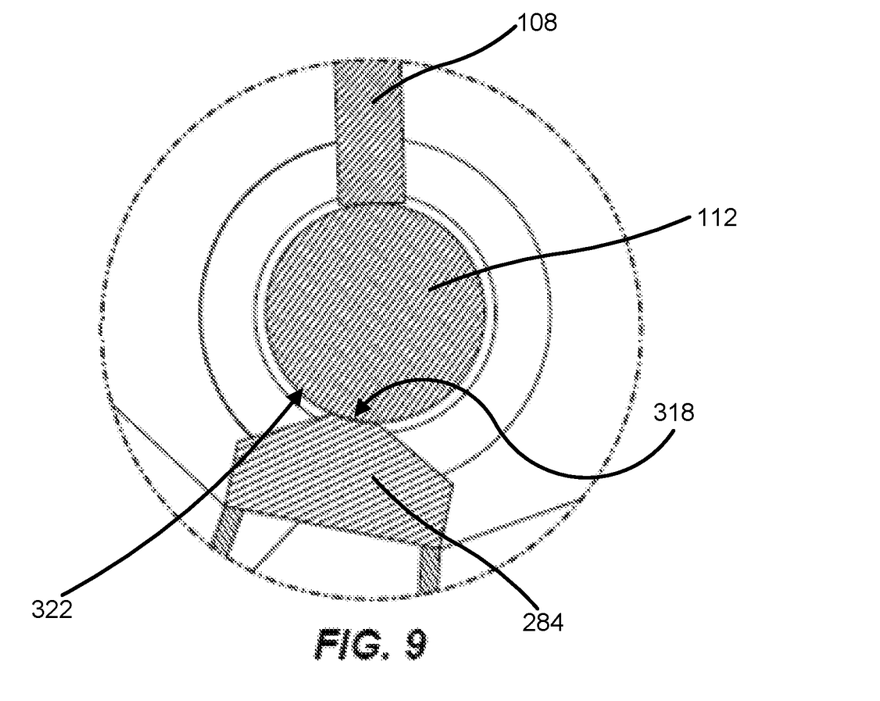
FIG. 9 is an enlarged view of a portion 9 of FIG. 6 showing the seal adjacent the flow diverter.

FIG. 9 depicts a cross-sectional view of the example cylindrical portion 112 and the seal bar 284 in the second position, as shown in FIG. 6. The seal bar 284 may be approximately pentagonal and have a curved surface 318 to correspond to a curved surface 322 of the cylindrical portion 112. The seal bar 284 is exposed to the fluid flowing through the valve 4 during cleaning operations to enable the valve 4 to be cleaned in place.

Figure 10:
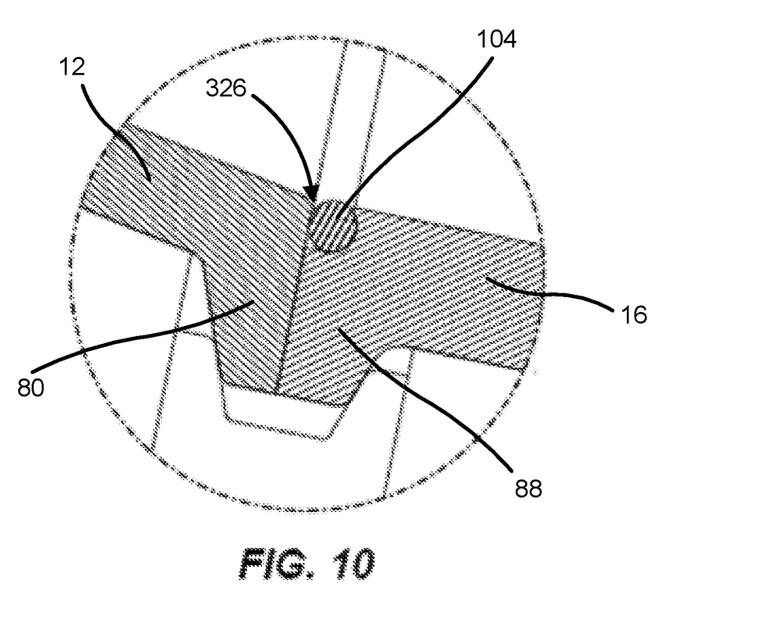
FIG. 10 is an enlarged view of a portion 10 of FIG. 6 showing the seal between the inlet portion and the outlet portion.

FIG. 10 depicts a detailed view of the first seal 104 between the inlet portion 12 and the outlet portion 16. The illustrated first seal 104 is an O-ring disposed circumferentially around the interior of the valve body 8. The first seal 104 may be disposed in a groove 326 formed by the outlet portion 16. The first seal 104 is exposed to the fluid flowing through the valve 4 during cleaning operations to enable the valve 4 to be cleaned in place.

Various features of the invention are set forth in the following claims.

What is claimed is:

1. A valve for a clean in place system, the valve comprising:
   an inlet portion;
   an outlet portion including a first outlet and a second outlet;
   a flow diverter positioned between the inlet portion and the outlet portion, the flow diverter including a planar portion sized to extend across the first and second outlets, and a cylindrical portion defining an opening;
   a first seal between the inlet portion and the outlet portion;
   an actuator for moving the flow diverter between a first position to form a first flow path in which the inlet is fluidly connected to the first outlet, and a second position to form a second flow path in which the inlet is fluidly connected to the second outlet, the actuator including
      an elongate fastener extending into the opening of the cylindrical portion;
      a first stub shaft engaging the opening such that the flow diverter rotates with the first stub shaft about a longitudinal axis of the elongate fastener;
      a second seal between the cylindrical portion and the first stub shaft;
      a bushing around the first stub shaft;
      a third seal between the bushing and the first stub shaft; and
      a second stub shaft to retain the bushing, the first stub shaft, the second seal, and the third seal on the elongate fastener and to compress the second and third seals; and
   wherein at least one of the first, second, and third seals is fluidly connected to the flow path.

2. The valve for a clean in place system as defined in claim 1, wherein the first, second, and third seals are fluidly connected to the flow path.

3. The valve for a clean in place system as defined in claim 1, further comprising a fourth seal positioned between the cylindrical portion of the flow diverter and the outlet portion.

4. The valve for a clean in place system as defined in claim 1, further comprising a clamp, wherein the inlet portion is removably coupled to the outlet portion by the clamp.

5. The valve for a clean in place system as defined in claim 4, wherein the inlet portion includes a first flange and the outlet portion includes a second flange, the first seal being positioned between the first flange and the second flange.

6. The valve for a clean in place system as defined in claim 1, wherein the actuator includes a lever that rotates to move the flow diverter between the first position and the second position.

7. The valve for a clean in place system as defined in claim 1, wherein the first stub shaft has a flange including a first surface and a second surface, wherein the second seal engages the first surface and the third seal engages the second surface.

8. The valve for a clean in place system as defined in claim 1, wherein the second stub shaft has a flange to engage the bushing and urge the bushing toward the third seal.

9. The valve for a clean in place system as defined in claim 1, wherein the flow diverter is removable from the outlet portion.

10. The valve for a clean in place system as defined in claim 1, wherein the opening of the cylindrical portion is a first opening and is positioned at a first end of the cylindrical portion, the elongate fastener is a first elongate fastener, and the bushing is a first bushing, the valve further including:
    a second elongate fastener extending into a second opening of the cylindrical portion at a second end opposite the first end;
    a third stub shaft engaging the second opening to rotate with the flow diverter;
    a fifth seal between the cylindrical portion and the third stub shaft;
    a second bushing around the third stub shaft;
    a sixth seal between the bushing and the third stub shaft; and
    a fourth stub shaft to retain the second bushing, the third stub shaft, the fifth seal, and the sixth seal on the second elongate fastener and to compress the fifth and sixth seals.

11. A clean in place system comprising:
    a fluid source;
    a first fluid channel;
    a second fluid channel;
    a valve configured to be coupled between the fluid source and the first fluid channel and the second fluid channel, the valve comprising
    an inlet portion coupled to the fluid source;
    an outlet portion including a first outlet coupled to the first fluid channel and a second outlet coupled to the second fluid channel;
    a flow diverter positioned between the inlet portion and the outlet portion, the flow diverter including a planar portion sized to extend across the first and second outlets, and a cylindrical portion defining an opening;
    a first seal between the inlet portion and the outlet portion;
    an actuator for moving the flow diverter between a first position to form a first flow path in which the inlet is fluidly connected to the first outlet, and a second position to form a second flow path in which the inlet is fluidly connected to the second outlet, the actuator including
       an elongate fastener extending into the opening of the cylindrical portion;
       a first stub shaft engaging the opening such that the flow diverter rotates with the first stub shaft about a longitudinal axis of the elongate fastener;
       a second seal between the cylindrical portion and the first stub shaft;
       a bushing around the first stub shaft;
       a third seal between the bushing and the first stub shaft; and
       a second stub shaft to retain the bushing, the first stub shaft, the second seal, and the third seal on the elongate fastener and to compress the second and third seals; and
    wherein at least one of the first, second, and third seals is fluidly connected to the flow path.

12. The clean in place system as defined in claim 11, wherein the first, second, and third seals are fluidly connected to the flow path.

13. The clean in place system as defined in claim 11, further comprising a fourth seal positioned between the planar portion of the actuator and the outlet portion.

14. The clean in place system as defined in claim 11, further comprising a clamp, wherein the inlet portion is removable coupled to the outlet portion by the clamp.

15. The clean in place system as defined in claim 14, wherein the inlet portion includes a first flange and the outlet portion includes a second flange, the first seal being positioned between the first flange and the second flange.

16. The clean in place system as defined in claim 11, wherein the actuator includes a lever that rotates to move the planar portion between the first position and the second position.

17. The clean in place system as defined in claim 11, wherein the first stub shaft has a flange including a first surface and a second surface, wherein the second seal engages the first surface and the third seal engages the second surface.

18. The clean in place system as defined in claim 11, wherein the second stub shaft has a flange to engage the bushing and urge the bushing toward the third seal.

19. The clean in place system as defined in claim 11, wherein the flow diverter is removable from the outlet portion.

20. The clean in place system as defined in claim 11, wherein the opening of the cylindrical portion is a first opening and is positioned at a first end of the cylindrical portion, the elongate fastener is a first elongate fastener, and the bushing is a first bushing, the valve further including:

a second elongate fastener extending into a second opening of the cylindrical portion at a second end opposite the first end;

a third stub shaft engaging the second opening to rotate with the flow diverter;

a fifth seal between the cylindrical portion and the third stub shaft;

a second bushing around the third stub shaft;

a sixth seal between the bushing and the third stub shaft; and     a fourth stub shaft to retain the second bushing, the third stub shaft, the fifth seal, and the sixth seal on the second elongate fastener and to compress the fifth and sixth seals.

\* \* \* \* \*